United States Patent Office 3,851,055
Patented Nov. 26, 1974

3,851,055
METHOD OF TREATING TARDIVE DYSKINESIA USING L-PROLYL L-LEUCYL GLYCINE AMIDE
John Herbert Cavanaugh, Libertyville, Ill., assignor to Abbott Laboratories, North Chicago, Ill.
No Drawing. Filed Mar. 1, 1973, Ser. No. 337,221
Int. Cl. C07c 103/52
U.S. Cl. 424—177　　　　　　　　　　　　3 Claims

ABSTRACT OF THE DISCLOSURE

A method of decreasing the involuntary movements associated with tardive dyskinesia in humans using L-prolyl L-leucyl glycine amide as the active agent.

DESCRIPTION OF THE INVENTION

This invention relates to a method of controlling or reducing the involuntary movements associated with tardive dyskinesia using L-prolyl L-leucyl glycine amide as the active agent.

Tardive dyskinesia is drug-induced syndrome characterized by violent involuntary movements and is one of the most serious psychiatric problems in the United States today. It is estimated that up to one-third of the patients in all mental institutions have the complication of tardive dyskinesia. The patients are institutionalized not only because of impaired mental ability, but also because their involuntary movements are so severe that they are considered hideous and simply because of their lack of control, render them completely helpless. This syndrome is produced by every known phenathiazine. Even a single dose of, for example, chloropromazine, administered 20 years ago, can produce tardive dyskinesia. The onset of symptoms may occur shortly after on up to 20 years after the discontinuance of phenathiazine therapy.

It is recommended that dosages of from 0.1 to 100 mg./kg. of body weight daily of L-prolyl L-leucyl glycine amide be employed to reduce the involuntary movements associated with tardive dyskinesia. More often the dosage range should be 1 to 50 mg./kg.

L-prolyl L-leucyl glycine amide has recently been synthesized and the tripeptide structure is now known and is as follows:

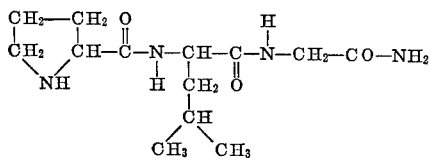

(See, for example, Celis et al. Biophysical Soc. Abstract TPM-K 12, p. 98 a, 1971.)

For convenience this amide will hereinafter be referred to as tripeptide.

For use in treating tardive dyskinesia, the tripeptide may be administered in either liquid or in solid form. Thus, the active compounds may be provided in granulation tablet, capsule, elixir and other dosage forms. Oral administration is preferred and is the most convenient. When administered orally in tablets, capsules and pills the tripeptide may be present in an amount of 1–500 mgs. Other means of administering may be employed such as, for example, by intraperitoneal or intramuscular injection. The active ingredients can also be incorporated in an oil or wax base and administered in the form of a suppository.

The following further illustrates pharmaceutical compositions in oral dosage form:

In order to prepare capsules, the following procedure was employed: Specially, here sufficient pharmaceutical composition was formulated to prepare 1,000 capsules. 25.00 gm. of L-prolyl L-leucyl glycine amide was preblended with 212.5 gm. of lactose, U.S.P. and 12.5 gm. of talc, U.S.P. The preblend was then passed through a suitable screen and the screened powders were then blended. The powders were then filled into gelatin size No. 3 capsules. The filled weight of ten capsules was 2.50 gm. The filled capsules were then cleaned with sodium chloride.

The following formulation is a typical tablet formula which may be used to incorporate the tripeptide:

TABLE I

| Ingredient: | Amount/tablet, mg. |
|---|---|
| Starch U.S.P. Corn | 13 |
| L-prolyl L-leucyl glycine amide | 50 |
| Calcium phosphate dibasic NF dihydrate | 132 |
| Magnesium stearate | 1 |
| Talcum (Talc U.S.P.) powder | 4 |
| Water, purified, U.S.P. distilled, q.s. | |
| | 200 |

I claim:

1. A method of reducing the involuntary movements associated with tardive dyskinesia comprising administering at least an effective amount of L-prolyl L-leucyl glycine amide to patients suffering from tardive dyskinesia.

2. The method of claim 1 wherein said amide is administered in an amount ranging from about 0.1 to about 100 mg./kg. of body weight daily.

3. The method of claim 2 wherein said dosage range is 1–50 mg./kg.

No references cited.

ELBERT L. ROBERTS, Primary Examiner

U.S. Cl. X.R.
260—112.5